United States Patent
Freeland et al.

(10) Patent No.: US 9,185,238 B1
(45) Date of Patent: Nov. 10, 2015

(54) SYSTEM AND METHOD FOR SCHEDULING, ESTABLISHING AND MAINTAINING AN OPEN COMMUNICATION CHANNEL WITH AN ADVISOR

(71) Applicant: OUTLOOK AMUSEMENTS, INC., Burbank, CA (US)

(72) Inventors: Stephen Jason Freeland, Los Feliz, CA (US); Burhan Khan, Brea, CA (US); Kristine Seale, Sherman Oaks, CA (US)

(73) Assignee: Outlook Amusements, Inc., Burbank, CA (US)

( * ) Notice: Subject to any disclaimer, the term of this patent is extended or adjusted under 35 U.S.C. 154(b) by 15 days.

(21) Appl. No.: 14/260,187

(22) Filed: Apr. 23, 2014

(51) Int. Cl.
| | |
|---|---|
| *H04M 3/42* | (2006.01) |
| *H04M 15/00* | (2006.01) |
| *G06Q 50/00* | (2012.01) |
| *G06Q 10/06* | (2012.01) |
| *H04M 3/51* | (2006.01) |
| *H04M 3/523* | (2006.01) |
| *H04M 17/00* | (2006.01) |

(52) U.S. Cl.
CPC ......... *H04M 15/68* (2013.01); *G06Q 10/06311* (2013.01); *G06Q 50/01* (2013.01); *H04M 3/5191* (2013.01); *H04M 3/5231* (2013.01); *H04M 17/10* (2013.01); *H04M 17/35* (2013.01)

(58) Field of Classification Search
CPC . H04L 5/0001; H04L 29/06176; H04L 67/12; H04M 1/72522; H04M 1/2535; H04M 1/27475; H04M 2203/2072; H04M 2207/18; H04M 3/42; H04M 3/4228; H04M 3/428; H04M 3/432; H04M 15/00; H04M 15/49; H04M 15/68; H04M 15/805; H04M 17/00; H04Q 2213/13176; H04Q 2213/1327; H04Q 2213/13272; H04Q 2213/13345; H04Q 3/0079; H04W 76/028; H04W 48/18; H04W 88/06; H04W 8/183

USPC ............... 379/88.1, 114.01, 114.05, 201.01, 379/201.02, 201.12, 202.01, 207.02, 379/207.04, 209.01, 210.01, 265.02, 379/265.09, 265.128; 455/407, 414.1, 455/422.1, 423, 435.1, 435.2, 450, 504, 455/509, 552.1

See application file for complete search history.

(56) References Cited

U.S. PATENT DOCUMENTS

| | | | | |
|---|---|---|---|---|
| 5,848,132 | A  * | 12/1998 | Morley et al. ............ | 379/210.01 |
| 6,430,281 | B1 * | 8/2002  | Morley et al. ............ | 379/210.01 |
| 6,704,403 | B2 * | 3/2004  | Lurie et al. ................. | 379/114.1 |
| 6,961,418 | B1 * | 11/2005 | Thygeson et al. ........ | 379/210.01 |
| 7,289,612 | B2 * | 10/2007 | Lurie et al. ................. | 379/114.1 |
| 7,369,850 | B2 * | 5/2008  | Andrew et al. ............ | 455/435.1 |
| 7,486,949 | B2 * | 2/2009  | Ignatin ....................... | 455/414.1 |
| 7,657,013 | B2 * | 2/2010  | Lurie et al. ................. | 379/114.1 |

(Continued)

*Primary Examiner* — Binh Tieu
(74) *Attorney, Agent, or Firm* — Fitzsimmons IP Law

(57) ABSTRACT

A system is provided for scheduling and maintaining an open communication channel between multiple parties. The system includes a client device connected to a host device via a network. The client device is configured to interact with a website in order to schedule a communication with an advisor. The client device can then be used to participate in the scheduled communication with the advisor. During the communication, a telephone application may be configured to monitor the communication channel between the parties. If the application determines that the client connection has been lost, the application may ask the advisor whether he/she wants to reestablish a connection with the client. If the answers is yes, then the application may ask the client if he/she wants to reestablish a call with the advisor. If the answer is yes, then the application will rejoin the client with the advisor over the communication channel.

30 Claims, 12 Drawing Sheets

(56) References Cited

U.S. PATENT DOCUMENTS

| | | | |
|---|---|---|---|
| 7,688,963 B1* | 3/2010 | Lang | 379/215.01 |
| 7,894,800 B2* | 2/2011 | Ignatin | 455/414.1 |
| 8,204,191 B2* | 6/2012 | Lurie et al. | 379/114.1 |
| 8,526,591 B2* | 9/2013 | Morken et al. | 379/210.01 |
| 8,634,531 B2* | 1/2014 | Morken et al. | 379/210.01 |
| 8,644,811 B2* | 2/2014 | Tsao et al. | 455/418 |
| 9,066,258 B2* | 6/2015 | Li et al. | 1/1 |
| 2002/0049073 A1* | 4/2002 | Bell | 455/552 |
| 2007/0274488 A1* | 11/2007 | Callaghan | 379/201.01 |
| 2008/0118047 A1* | 5/2008 | Nachum | 379/210.01 |
| 2010/0266113 A1* | 10/2010 | Hartley | 379/207.04 |
| 2012/0232742 A1* | 9/2012 | Elliott | 701/29.7 |
| 2013/0010935 A1* | 1/2013 | Lurie et al. | 379/88.01 |
| 2013/0287198 A1* | 10/2013 | Kotecha et al. | 379/207.02 |
| 2015/0078547 A1* | 3/2015 | Walls et al. | 379/265.09 |

* cited by examiner

CUSTOMER TESTIMONIALS

WRITE A TESTIMONIAL

SHOW ONLY: ALL ▸

SHOWING 1 TO 5 OF 134  VIEW ALL

ANONYMOUS, JANUARY 24, 2012  ⊛ FEATURED TESTIMONIAL

MY CONVERSATION WITH LOGAN WAS PLEASANT, POSITIVE AND UPLIFTING. SHE USED HER CLAIRVOYANCY TO CONNECT WITH ME IN ORDER TO PROVIDE AN HONEST, YET EXCITING READING.

ANONYMOUS, DECEMBER 14, 2013

HAPPY I CALLED LOGAN- SO MUCH SHE REFERRED TO THAT CAN ONLY HAVE MEANING TO ME & SHE COULD NOT POSSIBLY KNOW FROM OTHER SIDE OF PLANET WITHOUT CHANNELING LOVING SPIRITS. DIFFICULT HEARING, PERHAPS ACCENT & THE FACT I AM TRYING TO RECORD EVERY PRECIOUS WORD. UNTIL TRUTH MANIFESTS IN MY PHYSICAL WORLD I AM NOT 100% SURE BUT LOGAN PROVES OVER & AGAIN THAT CONNECTION IS REAL. LOVE HER FOR THAT BECAUSE I NEED TO BELIEVE WHAT SHE CONFIRMS.

JULIE, AVON, DECEMBER 13, 2013

LOGAN'S ABILITIES ARE AMAZING! DEFINITELY A PSYCHIC AND DEFINITELY A MEDIUM. PICKS UP ON DETAILS THAT JUST BLOW MY MIND! REALLY GOOD. SHE'S FAST, ARTICULATE AND HONEST. ONE OF THE BEST ON CP!

ANONYMOUS, DECEMBER 10, 2013

I FEEL THAT LOGAN IS VERY CONNECTED WITH ME AND IS ABLE TO GIVE ME THE INSIGHT INTO THINGS THAT ARE TO COME. THE MOST AMAZING THING THAT SHE SAID TO ME WAS WHEN I ASKED ABOUT MY DECEASED MOTHER. SHE REPLIED ROSARY. I WAS SHOCKED BECAUSE MY MOM ONLY USED THE ROSARY AS HER METHOD OF PRAYER MORNING, NOON AND NIGHT. THERE IS NO WAY THAT LOGAN COULD HAVE KNOWN ABOUT THAT BECAUSE THIS WAS THE FIRST TIME THAT I ASKED ABOUT MY MOTHER. GREAT EXPERIENCE.

ANONYMOUS, DECEMBER 3, 2013

THIS WOMAN IS INCREDIBLE! SHE CONNECTED WITH MY DECEASED HUSBAND AND WAS 100% CORRECT ABOUT FACTS, PERSONALITY AND THE MESSAGES HE GAVE TO ME. SHE ALSO ABSOLUTELY NAILED THE DESCRIPTION OF THE MAN THAT I JUST ENDED A RELATIONSHIP WITH. EVERYTHING SHE SAID WAS ACCURATE. SHE HAS BECOME MY FAVORITE AND I WILL USE HER AGAIN. I CANNOT STRESS HOW ABSOLUTELY ACCURATE LOGAN IS WITH HER CHANNELING AND READINGS.

---

⊕ APPOINTMENTS — 1040

SET A TIME TO SPEAK WITH LOGAN

| TH | FR | SA | SU | MO | TU | WE |
|----|----|----|----|----|----|----|
| TODAY DEC 19 | 6:00 PM | | | | | |

□ AVAILABLE  ▪ BOOKED

VIEW ALL APPOINTMENTS

CALLBACKS AND APPOINTMENTS

YOU HAVE NO CALLBACKS OR APPOINTMENTS SCHEDULED.

FIG. 10 (Cont.)

SYSTEM AND METHOD FOR SCHEDULING, ESTABLISHING AND MAINTAINING AN OPEN COMMUNICATION CHANNEL WITH AN ADVISOR

BACKGROUND OF THE INVENTION

1. Field of the Invention

The present invention relates to a social network device, and more particularly, to a system and method for scheduling, establishing and maintaining an open communication channel between at least one first party (e.g., a client) and at least one second party (e.g., an advisor).

2. Description of Related Art

Every day, hundreds of millions of people communicate with each other over various networks. For example, some people communicate using telecommunication devices (e.g., cellular telephones, landlines, etc.) connected via telecommunication networks (e.g., satellites, telephone lines, fiber-optic lines, etc.), while others communicate using computers (e.g., smart phones, personal computers, etc.) connected via a wide area network, like the Internet. While most communications are direct communications, in that one party is communicating directly with another party (e.g., via a telephone call, an email, etc.), other communications are indirect, and involve at least one intermediary person or device. For example, there are hundreds, if not thousands of social networking sites whose primary purpose is to act as an intermediary, and connect (or introduce) one party to another. Examples of such social networking sites include Facebook™, Match.Com™, and CaliforniaPsychics.Com™.

Social networking sites generally include pay services, where services are paid for after services are rendered. For example, a typical social network site may introduce a first party to a second party, and then charge the first party a per-minute rate for communicating with the second party. A typical psychic hotline is an example of a post-pay service, where the customer's credit card is charged after the call with the psychic is over, or after the amount due (which may be based on the length of the call) is known.

Other social network sites, however, may offer a prepaid service. While such services have advantage, they also have certain drawbacks. For example, using the psychic business method as an example, in order to charge the customer before his/her call with the psychic, the system would need to know which psychic will be participating in the call, and what will be the duration of the call. And in order to answer these two question, the customer would first need to identify a psychic that is available at a customer-selected time and for a customer-selected duration. Thus, in order to offer prepaid psychic services, the social network site would need to allow the customer to (i) select a psychic, (ii) schedule a time and duration that is acceptable to the psychic, and (iii) pay for the scheduled communication prior to the communication actually taking place.

In carrying out these steps, certain complications can arise. For example, because the availability of a psychic can change day-by-day, or hour-by-hour, it may be difficult for a customer to schedule a call with a psychic of their choice, at a time of their choice, and for a duration of their choice. Further, because services are being prepaid, it may be difficult (if not impossible) for a customer to extend a communication after the customer has paid for the communication. This is especially true if the customer is currently communicating with (or on the line with) the psychic. Finally, it may also be difficult (if not impossible) to maintain the scheduled communication if the customer's or the psychic's device or network is not operating properly, or is experiencing problems.

Therefore, there is a need to develop a system and method that addresses the foregoing drawbacks and complications associated with prepaid services. In particular, there is a need to develop a system and method for scheduling, establishing, extending and/or maintaining an open communication channel between a first party (e.g., a client, etc.) and a second party (e.g., an advisor, etc.).

SUMMARY OF THE INVENTION

The present invention provides a system and method for scheduling, establishing, and/or maintaining an open communication channel between a first party and a second party. Preferred embodiments of the present invention operate in accordance with at least one client device, at least one advisor device, and a host device, all connected via a network.

In a first embodiment of the present invention, a host device is used to schedule, establish, extend, and/or maintain an open communication channel between at least one client and at least one advisor. The advisor may use the advisor device to instruct the host device of the advisor's availability, the client may use the client device to schedule a communication with the advisor at a time that the advisor is available, and the client and the advisor may use their respective devices to participate in the scheduled communication.

In a preferred embodiment, the client device is configured to interact with a web server, which is operating on the host device, in order to display a website to the client. For example, the client may direct a web browser, which is operating on the client device, to a particular website. The client may then be provided with an opening web page that includes a number of options, including the ability to search for participating advisors. If the client chooses to search for advisors, the client may be presented with a list of participating advisors. The client may then scroll through the list, or sort the list using a plurality of predefined fields (e.g., availability, alphabetically, price, recently added, customer favorites, staff picks, etc.). Once the client selects an advisor that they would like to communicate with, the client may be presented with additional information on the selected advisor, and allowed to schedule a communication with the selected advisor. In doing so, the client may be allowed to choose from a list of preselected packages (e.g., preselected durations, etc.), and select a day and time for the communication that is good for both the client and the advisor.

In another embodiment of the present invention, a client may desire to identify a plurality of advisors, and schedule a communication with the first one who is identified (e.g., by the host device) as having availability on a particular day and at a particular time. In this example, the client may be provided with a plurality of selection boxes, one for each advisor. The client can then select (e.g., by checking the appropriate box) the advisors that he/she would like to communicate with. The client would then be presented with options similar to those discussed above (e.g., selecting a package, selecting a day/time for the communication, etc.). The client would then be notified (e.g., by email, etc.) as to the advisor that will be participating in the communication. The advisor may be, for example, the advisor that identifies themselves as available for the scheduled communication. If more than one advisor is available, additional criteria (e.g., ranking provided by the client, first advisor to be listed as available, etc.) can be used to select the advisor.

In another embodiment of the present invention, a client may desire to choose a duration that differs from the predetermined packages. To accommodate this, the client may be presented with a "slider" instead, or in addition to, the predefined packages. By interacting with the "slider," the client would be able to select a particular (or custom) duration for the scheduled communication. The host device may then be configured to calculate a dollar amount associated with the selected advisor and the selected duration, and provide that information to the client. The host device may also be configured to compare the selected advisor and the selected duration to the availabilities stored in a database to provide appointment options to the client.

In another embodiment of the present invention, a client may desire to alter the duration of the scheduled communication after the communication has been paid for, but before the communication has ended. To accomplish this, the host device may present the client with a list of scheduled (or in-process) communications via a web page. The client would then be given an option to select the scheduled (or in-process) communication, and modify the duration of the communication. For example, while participating in the scheduled communication, the client may realize that they need additional time with the advisor. The client could then go to the website, login, select the in-process communication, and request that the communication be extended (e.g., by a predetermined amount of time (e.g., by selecting a package, etc.), by a custom amount of time (e.g., by interacting with a "slider," etc.), etc.).

Once, the client has scheduled a communication, a client may participate in the communication via a telecommunication device, such as a telephone. In one embodiment of the present invention, both the client and the advisor call a phone number associated with the scheduled communication. A telephone application, which is operating on the host device, is configured to establish an open communication channel between the parties by joining the client and the advisor (e.g., via a telephony switch, etc.). Such a joinder may be similar to the joining of parties participating in a conference call, as generally known to those of ordinary skill in the art. After the parties have been joined, the telephone application is further configured to monitor and maintain the communication channel between the parties. For example, the telephone application may monitor the channel to determine whether the client connection has been lost. If it has, the telephone application may be configured to ask the advisor (e.g., using a computer generated or a prerecorded voice, etc.) whether the advisor wants to reestablish a connection with the client. If the advisor answers in the affirmative, then the telephone application may call the client and ask the client if he/she wants to reestablish a call with the advisor. If the client answers in the affirmative, then the telephone application will rejoin the client with the advisor over the communication channel. If, however, either party answers in the negative, then the telephone application may advise the other party accordingly, and terminate the communication (e.g., end the call).

A more complete understanding of a system and method for scheduling, establishing, and/or maintaining an open communication channel between a first party and a second party will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 10 illustrates a third exemplary web page that a client may access when scheduling a communication with an advisor.

DETAILED DESCRIPTION OF THE PREFERRED EMBODIMENT

The present invention provides a system and method for scheduling, establishing, and/or maintaining an open communication channel between a first party (e.g., a customer, etc.) and a second party (e.g., a psychic, etc.). It should be appreciated that while the present application describes the invention in terms of a first party communicating with a second party, the present invention is not so limited. For example, the present invention could be used to schedule, establish, extend and/or maintain an open communication channel between any client and any advisor (e.g., a financial advisor, spiritual advisor, psychic advisor, relationship advisor, medical advisor, etc.), or between more than two parties (e.g., a conference call, etc.).

Figure 1:
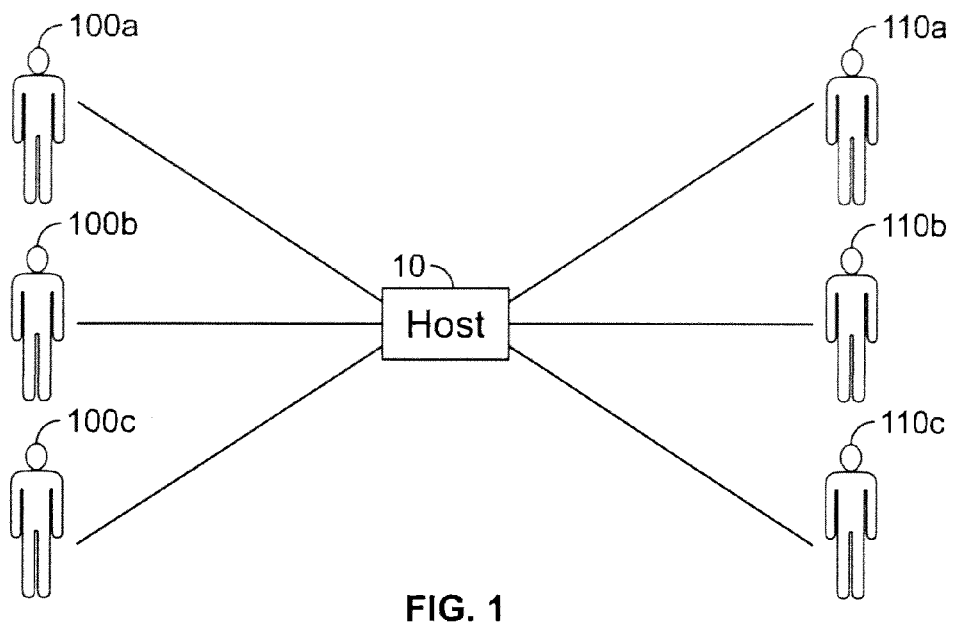
FIG. 1 illustrates an exemplary environment in which the present invention may operate, in which a host device communicates with a plurality of clients and a plurality of advisors.
Figure 2:
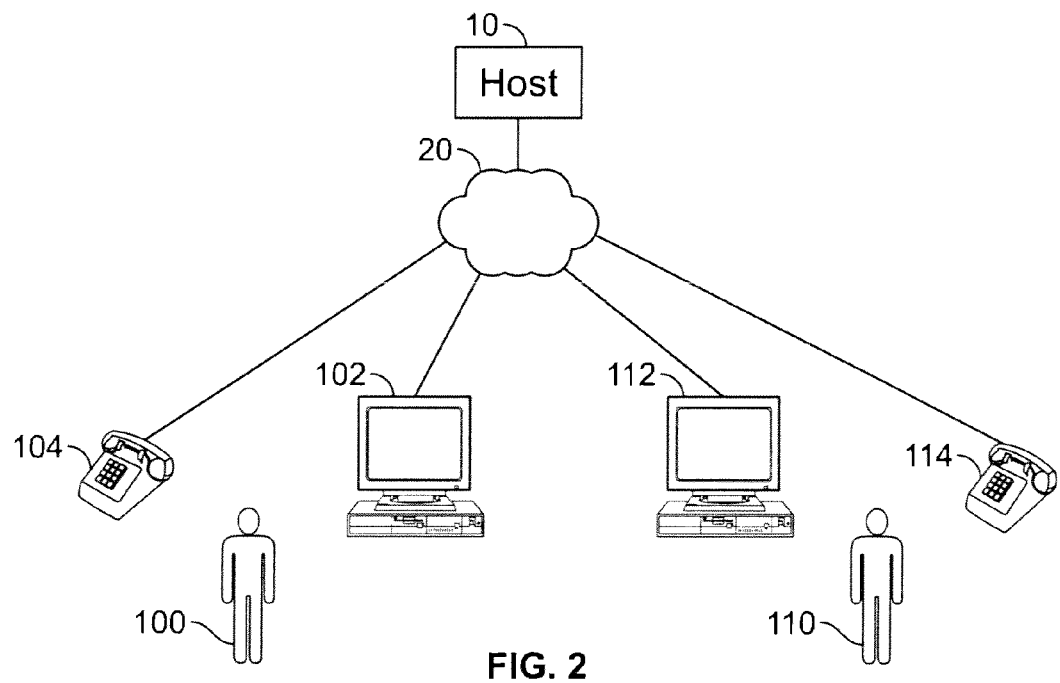
FIG. 2 illustrates an exemplary environment in which the present invention may operate, in which a host device communicates with at least one client device and at least one advisor device via a network.

In a preferred embodiment of the present invention, as shown in FIG. 1, a host device 10 is used to schedule, establish, extend, and/or maintain an open communication channel between at least one of a plurality of clients (i.e., 100a, 100b, 100c, etc.) and at least one of a plurality of advisors (i.e., 110a, 110b, 110c, etc.). In one embodiment of the present invention, each client (e.g., 100a) interacts with the host device 10 to schedule and participate in a communication between the client and at least one advisor (e.g., 110a, etc.). Such an interaction is shown in FIG. 2, where a particular client 100 is using a first and/or second client device 102, 104 to interact with the host device 10 via a network 20. Similarly, a particular advisor 110 may also use a first and/or second advisor device 112, 114 to interact with the host device 10 via a network 20. For example, the advisor 110 may use the first advisor device 112 to instruct the host device of the advisor's availability (e.g., by interacting with a web server portion of the host device), the client 100 may use the first client device 102 to schedule a communication with the advisor at a time that the advisor is available (e.g., by interacting with a web server portion of the host device), and the client 100 and advisor 110 may use the second client device 104 and the second advisor device 114, respectively, to participate in the scheduled communication.

It should be appreciated that while the first and second client devices 102, 104 and the first and second advisor devices 112, 114 are shown as a personal computer and a hardwired telephone, respectively, the present invention is not so limited. For example, a system that is configured to communicate with any telecommunication device (e.g., a cordless telephone, a cellular telephone, a smart phone, etc.) or any computing device (e.g., a personal computer, a laptop, a smart phone, etc.) is within the spirit and scope of the present invention. It should also be appreciated that the network 20 shown in the figures is not limited to any particular network and can include, for example, any telecommunication network (e.g., satellite, telephone lines, fiber-optic lines, etc.), any wide area network (WAN) (e.g., the Internet), any local area network (LAN), or any combination thereof. For example, the client may be using a telephone, which is connected to a telecommunication network, to participate in the scheduled communication, and the advisor may be using a personal computer, which is connected to the Internet, to participate in the scheduled communication (e.g., via VOIP, etc.).

Figure 3:
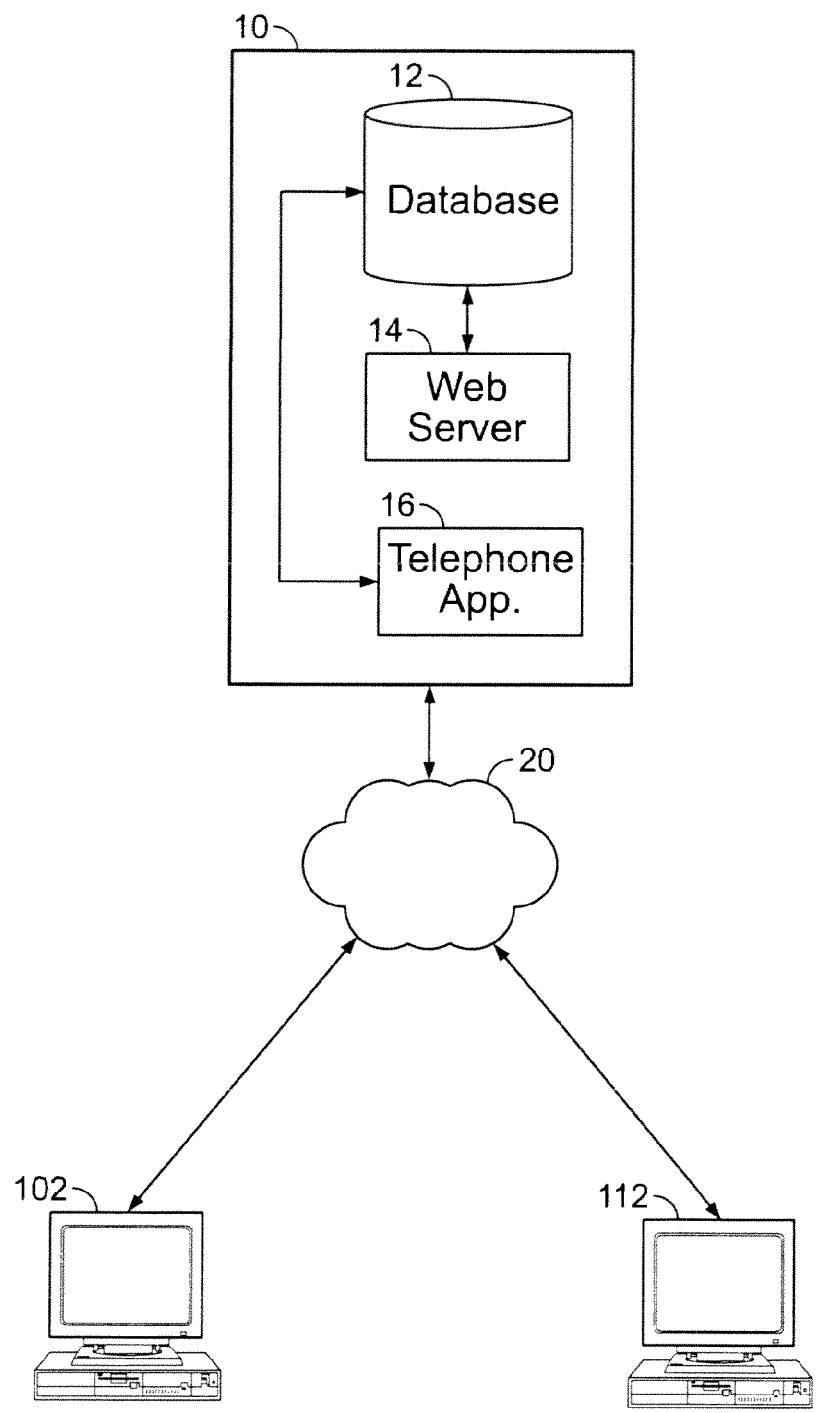
FIG. 3 illustrates a first embodiment of the present invention, in which a host device communicates with a first client device and a first advisory device over a network.
Figure 8:
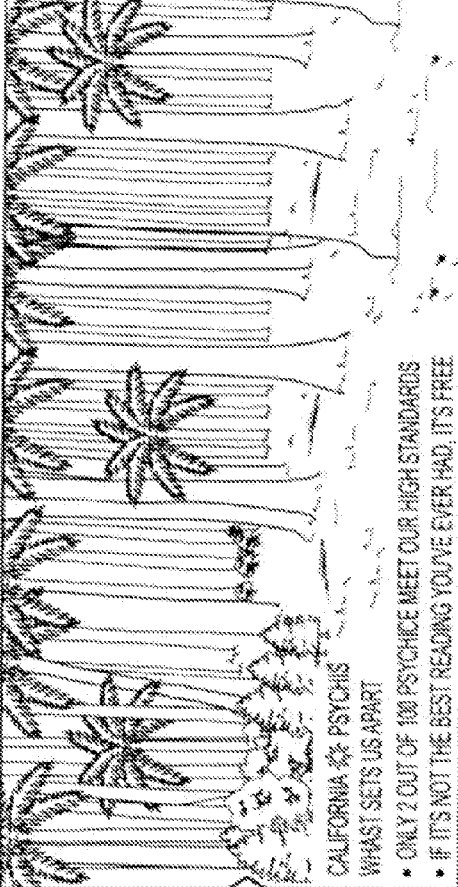
FIG. 8 illustrates a first exemplary web page that a client may access when scheduling a communication with an advisor.

In accordance with at first embodiment of the present invention, as shown in FIG. 3, a client may use a first client device 102 to interact with the host 10 via the network 20. In a preferred embodiment, this is done by interacting with a web server 14, which is operating on the host device 10, in order to interact with a website. For example, by directing a web browser operating on the first client device 102 to a particular website, the client can be provided with an opening web page. As shown in FIG. 8, such a web page may provide the client with a number of options, including the ability to search a list of participating advisors 800. It should be appreciated that the present invention is not limited to the features shown in FIG. 8. For example, the opening web page may allow the client to login to the website (e.g., via user name and password), and to view the client's personalized web page (e.g., including features and/or advisors that have been selected by the client and/or selected by the system for the client). By way of another example, the opening web page may allow the advisor to login to the website (e.g., allowing the advisor to view scheduled communications, update their availability, and update their settings (e.g., pricing, etc.)). As with the client, the advisor can interact with the website via a web browser operating on the first advisor device (see FIG. 3 at 112). Information concerning the client and the advisor can be stored, for example, in a database (see FIG. 3 at 12).

Figure 9:
FIG. 9 illustrates a second exemplary web page that a client may access when scheduling a communication with an advisor.
Figure 9:
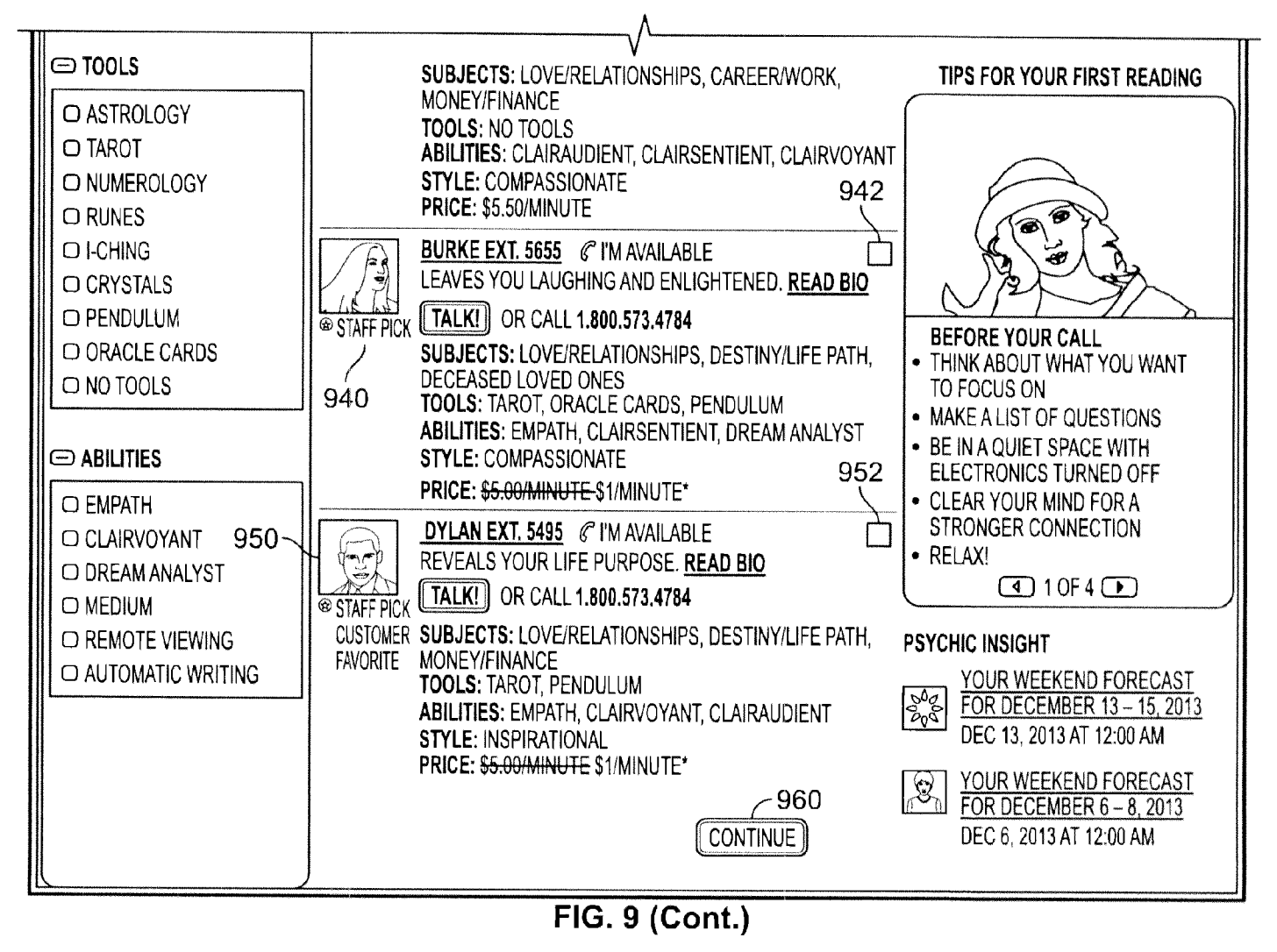
Figure 10:
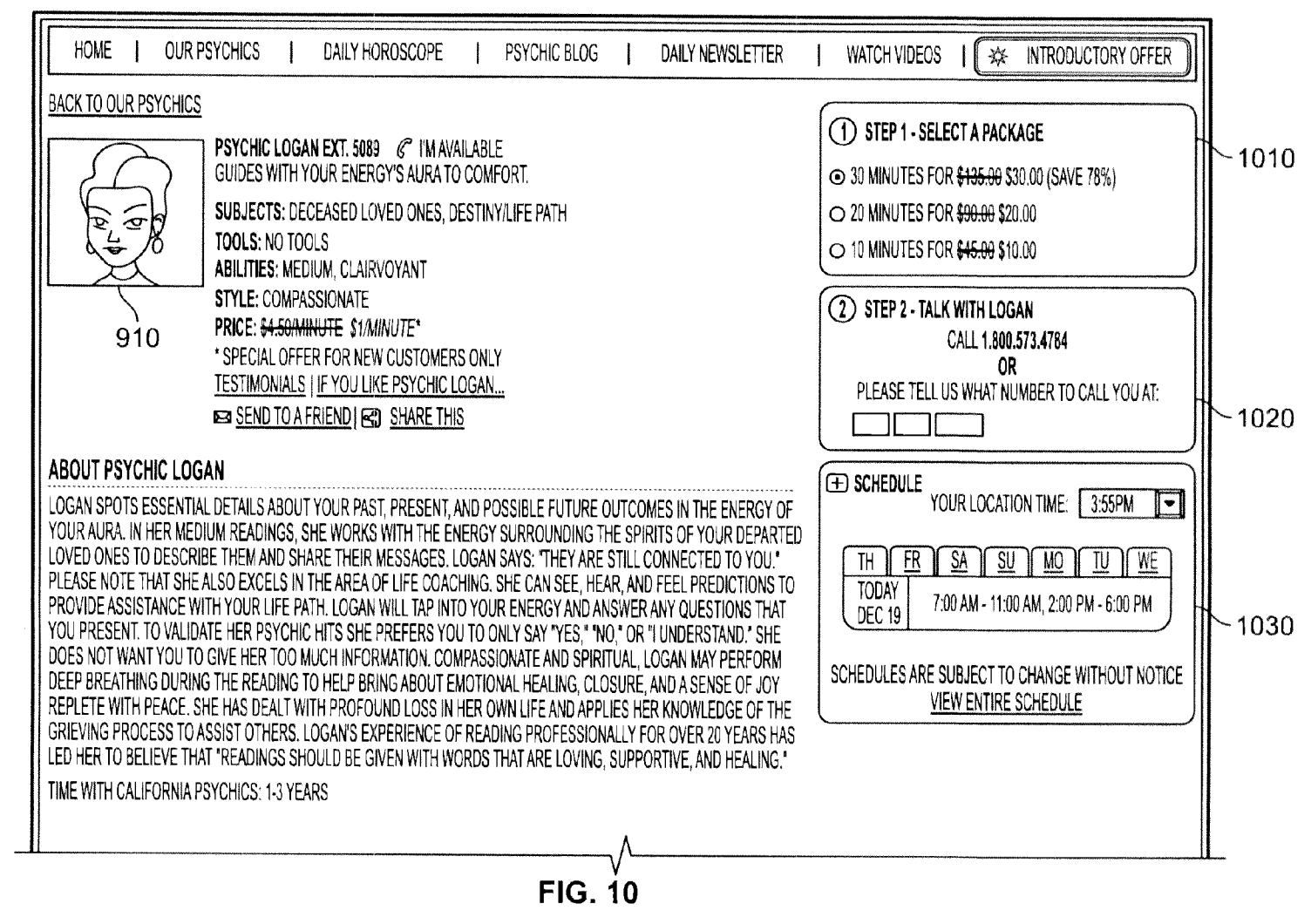

If the client chooses to search a list of participating advisors (see FIG. 8 at 800), the client may be presented with a list of participating advisors (e.g., 910, 920, 930, 940, 950, etc.), as shown in FIG. 9. The client may scroll through the list, or sort the list using a plurality of predefined fields 900 (e.g., availability, alphabetically, price, recently added, customer favorites, staff picks, etc.). Once the client selects an advisor that they would like to communicate with (e.g., by "clicking" on the advisor), the client may be presented with additional information on the selected advisor, as shown in FIG. 10. The client will then allowed to schedule a communication with the selected advisor. For example, the client may choose from a list of preselected packages 1010 (e.g., preselected durations, etc.). The client may then be provided with the option of participate in the communication by calling a predetermined telephone number, or having the system (or advisor) call them at a number to be provided by the client 1020. The client can then view the schedule of the advisor 1030, and select a day and time that is good for both the client and the advisor 1040.

It should be appreciated that the present invention is not limited to the foregoing description concerning scheduling a communication. For example, because an advisor's availability may change day-by-day, or hour-by-hour, a client may desire to identify a plurality of advisors, and schedule a communication with the first one who is identified (e.g., by the host device) as having availability on a particular day and at a particular time. An example of such an embodiment can be seen in FIG. 9, where a plurality of advisors (i.e., 910, 920, 930, 940 and 950) are listed. In this example, the client is provided with a plurality of selection boxes (i.e., 912, 922, 932, 942 and 952), one for each advisor. If the client desires to communicate with either the first listed advisor 910 or the third listed advisor, then the client can check the corresponding selection boxes (i.e., 912 and 932) and select "continue" 960. The client would then be presented with options similar to those shown in FIG. 10, i.e., select a package 1010, talk with an advisor 1020, and select a day and time for the communication 1040. The client would then be notified (e.g., by email, etc.) as to the advisor that will be participating in the communication. The advisor may be, for example, the advisor that identifies themselves (e.g., to the host device) as available for the scheduled communication. If more than one advisor is available, additional criteria (e.g., ranking provided by the client, etc.) can be used to select the advisor.

Figure 6:
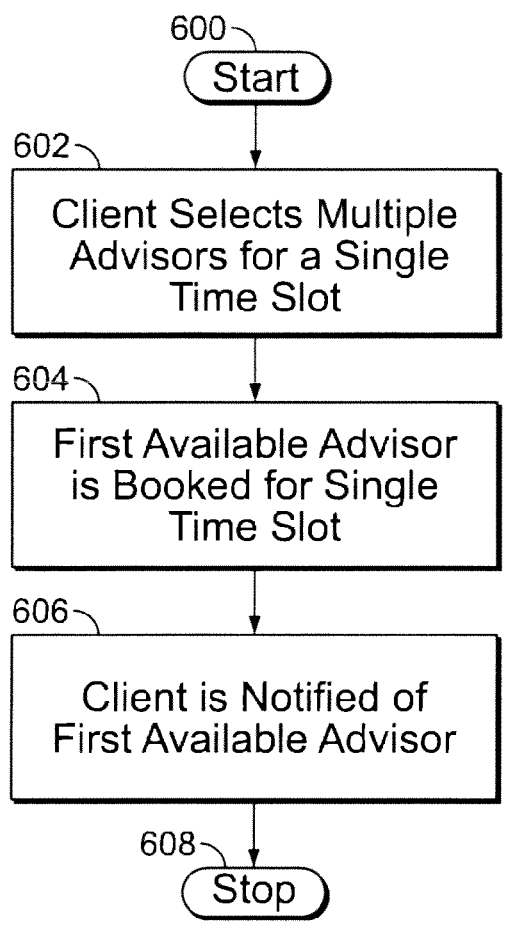
FIG. 6 illustrates a method for establishing a connection between a client and one of a plurality of advisors, in accordance with a fourth embodiment of the present invention.

A method of carrying out the foregoing embodiment is shown in FIG. 6. In particular, starting at step 600, a client selects a plurality of advisors for a single time slot at step 602. The system then books the first available advisor from the selected advisors for the time slot at step 604. The client is notified of the first available advisor as step 606, ending the process at step 608.

By way of another example, a client may desire to choose a duration that differs from the predetermined packages that are available (see FIG. 10 at 1010). To accommodate such a situation, the client may be provided with a "slider" (not shown) instead (or in addition to) the packages shown in FIG. 10. By interacting with the "slider," the client would be able to select a particular (or custom) duration for the scheduled communication (e.g., 25 minutes, 37 minutes, etc.). The host device may then be configured to calculate a dollar amount associated with the selected advisor and the selected duration, and provide that information to the client. The host device may also be configured to compare the selected advisor and the selected duration to the availabilities stored in the database (i.e., FIG. 3 at 12) to provide appointment options to the client.

By way of yet another example, a client may desire to alter the duration of a scheduled communication after the communication has been paid for, but before the communication has ended. To accomplish this, the host device may present the client with a list of scheduled (or in-process) communications via a web page. In a preferred embodiment, the list of scheduled (or in-process) communications would be stored in a database and presented to the client after the client has logged in to the website. The client would then be given an option of selecting the scheduled (or in-process) communication, and modifying the duration of the communication. For example, after scheduling a communication, a client may realize that the communication conflicts with another appointment, and decide to shorten (or cancel) the communication. Similarly, while participating in the scheduled communication, the client may realize that they need additional time with the advisor, and decide to extend the communication. In extending the communication, the host device may check the client's account, to make sure necessary funds are available for the extension, may check the advisor's availability (e.g., in the database), to make sure that the advisor is available for the extension, and (if the communication is in-process) check to make sure that the amount of time remaining is less than or equal to a predetermined amount of time (e.g., only allowing extensions when the time left is less than five minutes, etc.). It should be appreciated that the step of checking for available funds may involve checking the client's account with the website, if such an account exists, or checking the client's account with a financial institution (e.g., debit card, credit card, checking account, etc.). In extending the duration of a communication, the client may be presented with several packages (e.g., extend the communication by 10 minutes, etc.), and/or may interact with a "slider" to select a customized extension.

Figure 7:
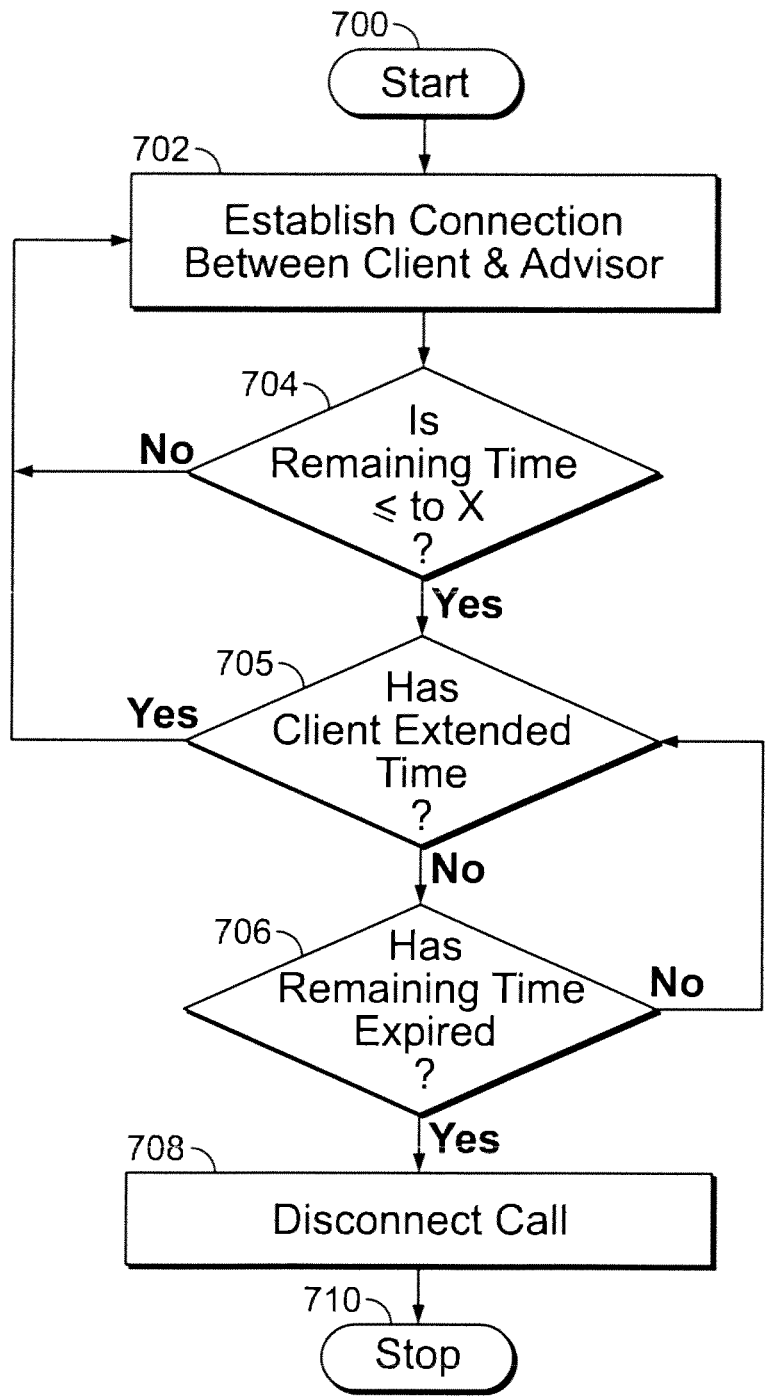
FIG. 7 illustrates a method for extending a connection between a second client device and a second advisory device (see FIG. 4), in accordance with a fifth embodiment of the present invention.

A method of extending the duration of a communication while the communication is in-process is shown in FIG. 7. In particular, starting at step 700, a connection is established between the client and the advisor at step 702. A determination is then made at step 704 as to whether the time remaining is less than or equal to a predetermined amount of time. If the answer is NO, then the process continues at step 702. If the answer is YES, a determination is made at step 705 as to whether the client has interacted with the website to extend the duration of the call. If the answer is YES, then the process continues at step 702. If the answer is NO, then a determination is made at step 706 as to whether the time remaining has expired. If the answer is NO, then the process continues at step 705. If the Answer is YES, then the call is disconnected at step 708, ending the process at step 710. It should be appreciated that the present invention is not limited to the foregoing steps. For example, a method that excludes certain steps is within the spirit and scope of the present invention. Similarly, a method that includes different or additional steps (e.g., checking to see if the client has sufficient funds, etc.) is also within the spirit and scope of the present invention.

Figure 4:
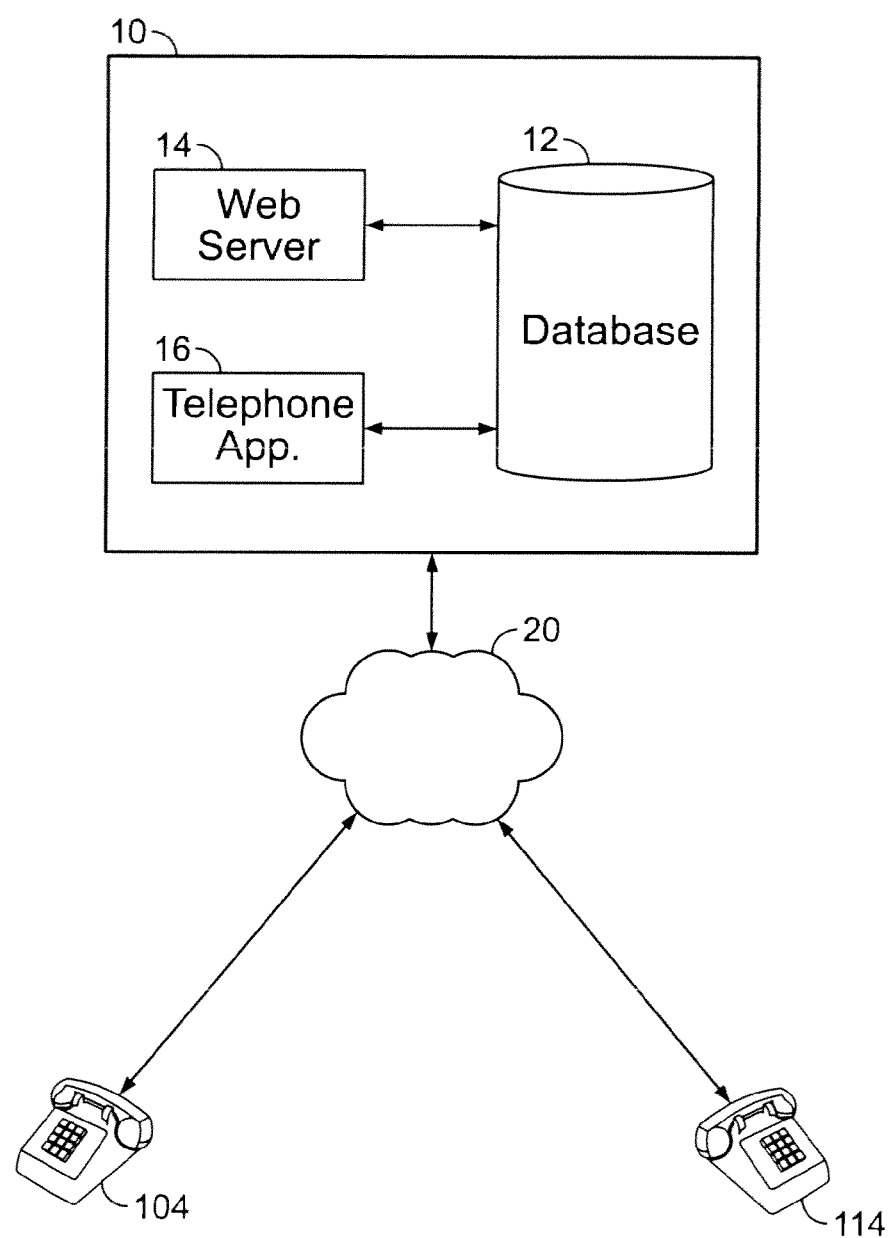
FIG. 4 illustrates a second embodiment of the present invention, in which a host device communicates with a second client device and a second advisory device over a network.

Once, the client has scheduled a communication, a client may participate in the communication via a telecommunication device, such as a telephone, as shown in FIG. 4. In one embodiment of the present invention, both the client and the advisor call a phone number (e.g., a 1-800 number) associated with the scheduled communication. The phone number may be assigned by the host device 10, and stored in the database 12. The host device 10 includes a telephone application 16 configured to assign and provide the phone number to the client and/or advisor, and may establish an open communication channel between the parties. For example, after the client and the advisor have called in, the telephone application may be configured to join the client and the advisor (e.g., via a telephony switch, etc.). Such a joinder may be similar to the joining of parties participating in a conference call, as generally known to those of ordinary skill in the art.

It should be appreciated that the present invention is not limited to the providing of a single phone number to both the client and the advisor. For example, a system that provides different phone numbers to the client and the advisor is within the spirit and scope of the present invention. A system that is configured to call the client and/or the advisor at the time of the scheduled communication (see FIG. 10 at 1020) is also within the spirit and scope of the present invention. For example, the advisor may call a telephone number associated with the scheduled communication, and the telephone application 16 may call the client at a number provided by the client, and join the advisor and the client once both of them are on the line. It should also be appreciated that present invention is not limited to communications involving telephones. For example, one party may be calling the other party from a computing device, e.g., using VOIP. By way of another example, the two parties may be video chatting with one another, e.g., using computing devices and at least one multimedia application (e.g., like Skype).

In another embodiment of the present invention, the telephone application 16 is further configured to monitor and maintain the communication channel between the parties. For example, the telephone application 16 may monitor the communication channel to determine whether a connection with one of the parties has been lost. For example, if the connection with the client has been lost, and there is still time left in the scheduled communication, the telephone application may ask the advisor (e.g., using a computer generated or a prerecorded voice, etc.) whether the advisor wants to reestablish a connection with the client. If the advisor answers in the affirmative (e.g., presses 1 for YES, or 2 for NO), then the telephone application may call the client and ask the client if he/she wants to reestablish a call with the advisor. If the client answers in the affirmative (e.g., presses 1 for YES, or 2 for NO), then the telephone application 16 will rejoin the client with the advisor over the communication channel. If, however, either party answers in the negative, then the telephone application may advise the other party accordingly, and terminate the communication (e.g., end the call). If the call is terminated early, the host device 10 may show the advisor (e.g., on the website) as presently available for communications.

Figure 5:
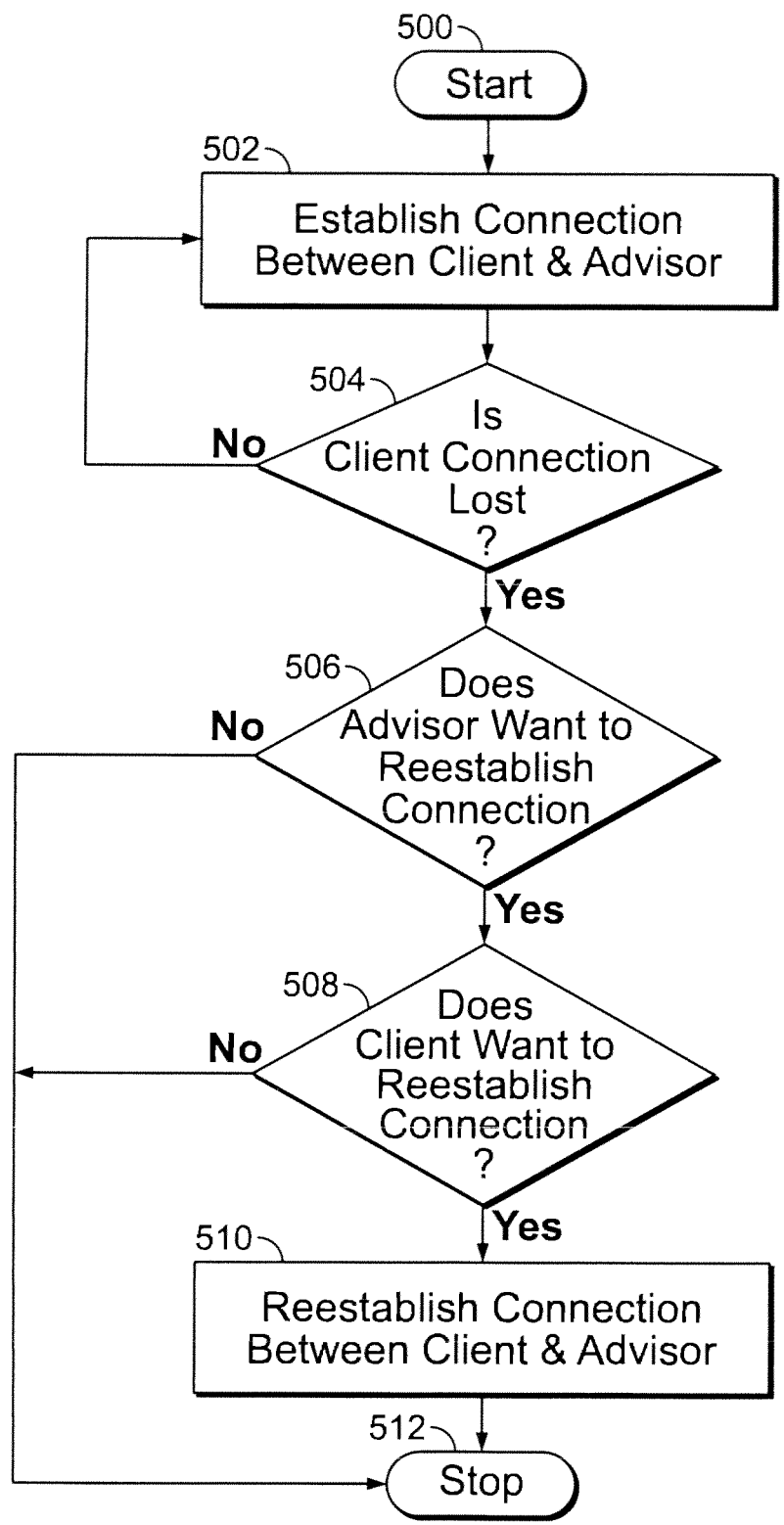
FIG. 5 illustrate a method for reestablishing a connection between the second client device and the second advisory device (see FIG. 4), in accordance with a third embodiment of the present invention.

A method of reestablishing a connection in accordance with one embodiment of the present invention is shown in FIG. 5. Starting at step 500, a connection is established between a client and an advisor at step 502. A determination is then made at step 504 as to whether a connection with the client has been lost. If the answer is NO, then the process continues at step 502. If the answer is YES, then a determination is made at step 506 as to whether the advisor wants to reestablish a connection with the client. If the answer is NO, then the process stops at step 512. If the answer is YES, then a determination is made at step 508 as to whether the client wants to reestablish a connection with the advisor. If the answer is NO, then the process stops at step 512. If, however, the answer is YES, then communication is reestablished between the client and the advisor at step 510, ending the process at step 512. It should be appreciated that the present invention is not limited to the steps shown in FIG. 5, and may include fewer, different, or additional steps. For example, a method that includes a determination of whether a connection with the advisor has been lost, where the client is the one who initiates the reconnection process, is within the spirit and scope of the present invention. By way of another example, other factors may determine whether a reconnection process is in order, including whether the customer's account has sufficient funds (e.g., equal to or greater than a predetermined amount), whether the length of the actual communication was equal to or greater than a minimum length of time (as stored in the database), and/or whether the length of the actual communication was equal to or less than a maximum length of time (as stored in the database).

The foregoing description of a system and method for scheduling, establishing, and/or maintaining an open communication channel between a first party and a second party has been presented for the purposes of illustration and description. It is not intended to be exhaustive or to limit the invention to the precise forms disclosed, and many modifications and variations are possible in light of the above teachings. Those skilled in the art will appreciate that there are a

What is claimed is:

1. A method for reestablishing communication between a client and an advisor, comprising:
   establishing an open communication channel between a client device and an advisor device;
   determining whether said client device is connected to said open communication channel;
   sending a first set of verbal instructions to said advisor device when said client device is no longer connected to said open communication channel;
   sending a second set of verbal instructions to said client device when an affirmative response is received from said advisor device in response to said first set of verbal instructions; and
   reconnecting said client device to said open communication channel when an affirmative response is received from said client device in response to said second set of verbal instructions.

2. The method of claim 1, wherein said step of establishing an open communication channel between a client device and an advisor device further comprises:
   receiving a request from said client to communicate with said advisor; and
   establishing said open communication channel on a telephony network with said advisor device;
   allowing said client device to connect to said open communication channel.

3. The method of claim 2, wherein said step of receiving a request from said client to communication with said advisor further comprises:
   receiving a request from said client to communicate with said advisor at a predetermined time and for a predetermined length of time, and
   requiring said client to pay for predetermined length of time before one of establishing said open communication channel on said telephony network with said advisor device and allowing said client device to connect to said open communication channel.

4. The method of claim 1, wherein said step of sending a first set of verbal instructions to said advisor device further comprises:
   determining whether said advisor device is connected to said open communication channel; and
   sending said first set of verbal instructions to said advisor device when said client device is no longer connected to said open communication channel and said advisor device is still connected to said open communication channel.

5. The method of claim 1, wherein said step of sending a first set of verbal instruction to said advisor device further comprises instructing said advisor to interact with said advisor device a first way if said advisor wants to said client device to rejoin said open communication channel, and to interact with said advisor device a second way if said advisor wants to close said open communication channel.

6. The method of claim 5, wherein said step of sending a second set of verbal instructions to said client device further comprises sending said second set of verbal instructions to said client device if said advisor interacts with said advisor device in said first way.

7. The method of claim 1, wherein said step of sending a second set of verbal instructions to said client device further comprises instructing said client to interact with said client device in a first way if said client wants to further communicate with said advisor via said open communication channel, and to interact with said client device a second way if said client does not want to further communicate with said advisor via said open communication channel.

8. The method of claim 7, wherein said step of reconnecting said client device to said open communication channel further comprises reconnecting said client device to said open communication channel if said client interacts with said client device in said first way.

9. The method of claim 1, further comprising:
   determining whether a period of time that said open communication channel has been established between said client device and said advisor device is at least one of greater than a lower threshold time period and less than an upper threshold time period; and
   sending said first set of verbal instructions to said advisor device when said client device is no longer connected to said open communication channel and if said period of time is at least one of greater than said lower threshold time period and less than said upper threshold time period.

10. The method of claim 1, further comprising:
    determining whether an account of said client has a monetary amount greater than a lower threshold monetary amount; and
    sending said first set of verbal instructions to said advisor device when said client device is no longer connected to said open communication channel and if said monetary amount is greater than a lower threshold monetary amount.

11. A system for reestablishing communication between a client and an advisor, comprising:
    a computing system in communication with at least one network and comprising at least one memory device for storing machine readable instructions adapted to perform the steps of:
    establishing an open communication channel over said at least one network and between a client device and an advisor device;
    determining whether said client device is connected to said open communication channel;
    sending a first set of verbal instructions to said advisor device when said client device is no longer connected to said open communication channel;
    sending a second set of verbal instructions to said client device when an affirmative response is received from said advisor device in response to said first set of verbal instructions; and
    reconnecting said client device to said open communication channel when an affirmative response is received from said client device in response to said second set of verbal instructions.

12. The system of claim 11, wherein said step of establishing an open communication channel between a client device and an advisor device further comprises:
    receiving a request from said client to communicate with said advisor; and
    establishing said open communication channel on a telephony network with said advisor device;
    allowing said client device to connect to said open communication channel.

13. The system of claim 12, wherein said step of receiving a request from said client to communication with said advisor further comprises:

receiving a request from said client to communicate with said advisor at a predetermined time and for a predetermined length of time, and requiring said client to pay for predetermined length of time before one of establishing said open communication channel on said telephony network with said advisor device and allowing said client device to connect to said open communication channel.

14. The system of claim 11, wherein said step of sending a first set of verbal instructions to said advisor device further comprises:

determining whether said advisor device is connected to said open communication channel; and sending said first set of verbal instructions to said advisor device when said client device is no longer connected to said open communication channel and said advisor device is still connected to said open communication channel.

15. The system of claim 11, wherein said step of sending a first set of verbal instruction to said advisor device further comprises instructing said advisor to interact with said advisor device a first way if said advisor wants to said client device to rejoin said open communication channel, and to interact with said advisor device a second way if said advisor wants to close said open communication channel.

16. The system of claim 15, wherein said step of sending a second set of verbal instructions to said client device further comprises sending said second set of verbal instructions to said client device if said advisor interacts with said advisor device in said first way.

17. The system of claim 11, wherein said step of sending a second set of verbal instructions to said client device further comprises instructing said client to interact with said client device in a first way if said client wants to further communicate with said advisor via said open communication channel, and to interact with said client device a second way if said client does not want to further communicate with said advisor via said open communication channel.

18. The system of claim 17, wherein said step of reconnecting said client device to said open communication channel further comprises reconnecting said client device to said open communication channel if said client interacts with said client device in said first way.

19. The system of claim 11, further comprising:

determining whether a period of time that said open communication channel has been established between said client device and said advisor device is at least one of greater than a lower threshold time period and less than an upper threshold time period; and sending said first set of verbal instructions to said advisor device when said client device is no longer connected to said open communication channel and if said period of time is at least one of greater than said lower threshold time period and less than said upper threshold time period.

20. The system of claim 11, further comprising:

determining whether an account of said client has a monetary amount greater than a lower threshold monetary amount; and sending said first set of verbal instructions to said advisor device when said client device is no longer connected to said open communication channel and if said monetary amount is greater than a lower threshold monetary amount.

21. A method for reestablishing communication between a first party and a second party, comprising:

establishing a telephone line between a first telephone and a second telephone, wherein said first telephone is being used by said first party and said second telephone is being used by said second party;

determining whether said first telephone is connected to said telephone line;

sending a first communication to said second telephone over said telephone line if said first telephone is no longer connected to said telephone line;

receiving a first command from said second telephone over said telephone line, wherein said first command (i) is received after said first communication has been sent to said second telephone and (ii) indicates whether said second party wishes to further communicate with said first party;

sending a second communication to said first telephone over a new telephone line if said first command indicates that said second party wishes to further communicate with said first party;

receiving a second command from said first telephone over said new telephone line, wherein said second command (i) is received after said second communication has been sent to said first telephone and (ii) indicates whether said first party wishes to further communicate with said second party; and reconnecting said first telephone to said telephone line if said second command indicates that said first party wishes to further communicate with said second party.

22. The method of claim 21, wherein said step of establishing a telephone line between a first device and a second device further comprises:

receiving a request from said first party to communicate with said second party; and establishing said telephone line between a host service and said second telephone;

connecting said first telephone to said telephone line.

23. The method of claim 22, wherein said step of receiving a request from said first party to communication with said second party further comprises:

receiving a request from said first party to communicate with said second party at a predetermined time and for a predetermined period of time, and requiring said first party to pay for said predetermined period of time before one of establishing said telephone line between a host service and said second telephone and connecting said first telephone to said telephone line.

24. The method of claim 21, wherein said step of sending a first communication to said second telephone further comprises:

determining whether said second telephone is connected to said telephone line; and sending said first communication to said second telephone when said first telephone is no longer connected to said telephone line and said second telephone is still connected to said telephone line.

25. The method of claim 21, wherein said step of sending a first communication to said second telephone further comprises instructing said second party to press a first button on said second telephone if said second party wants said to reconnect said second telephone to said telephone line, and to press a second button on said second telephone if said second party wants to end the telephone call between the first and second parties.

26. The method of claim 25, wherein said step of sending a second communication to said first telephone further comprises sending said second communication to said first telephone if said second party presses said first button on said second telephone.

27. The method of claim 21, wherein said step of sending a second communication to said first telephone further comprises instructing said first party to press a first button on said first telephone if said first party wants to further communicate with said second party via said telephone line, and to press a second button on said first telephone if said first party does not want to further communicate with said second party via said telephone line.

28. The method of claim 27, wherein said step of reconnecting said first telephone to said telephone line further comprises reconnecting said first telephone to said telephone line if said first party presses said first button on said first telephone.

29. The method of claim 21, further comprising:
   determining whether a period of time that said telephone line has been established between said first telephone and said second telephone is at least one of greater than a lower threshold time period and less than an upper threshold time period; and sending said first communication to said second telephone when said first telephone is no longer connected to said telephone line and if said period of time is at least one of greater than said lower threshold time period and less than said upper threshold time period.

30. The method of claim 21, further comprising:
   determining whether a monetary account of said first party has a value that is greater than a lower threshold value; and sending said first communication to said second telephone when said first telephone is no longer connected to said telephone line and if said value is greater than a lower threshold value.

* * * * *